United States Patent
Zolotnik et al.

(10) Patent No.: US 7,179,562 B2
(45) Date of Patent: Feb. 20, 2007

(54) BATTERY ELECTRODE ASSEMBLY AND FABRICATION METHOD THEREFOR

(75) Inventors: Vladimir Zolotnik, West Hills, CA (US); Alex Z. Pàl, Montrose, CA (US); Jose A. Ulloa, Valencia, CA (US); Vladimir Gusev, Woodland Hills, CA (US); Joseph Wong, Glendale, CA (US)

(73) Assignee: Quallion LLC, Sylmar, CA (US)

( * ) Notice: Subject to any disclaimer, the term of this patent is extended or adjusted under 35 U.S.C. 154(b) by 595 days.

(21) Appl. No.: 10/630,541

(22) Filed: Jul. 29, 2003

(65) Prior Publication Data

US 2004/0161669 A1    Aug. 19, 2004

Related U.S. Application Data

(60) Provisional application No. 60/447,802, filed on Feb. 14, 2003.

(51) Int. Cl.
*H01M 4/02* (2006.01)
*H01M 2/26* (2006.01)
*H01M 6/00* (2006.01)

(52) U.S. Cl. ............... 429/211; 429/161; 429/233; 29/623.1

(58) Field of Classification Search ............... None
See application file for complete search history.

(56) References Cited

U.S. PATENT DOCUMENTS

| | | | |
|---|---|---|---|
| 3,094,438 A | 6/1963 | Daley et al. | |
| 3,791,868 A | 2/1974 | Compton et al. | |
| 4,172,319 A | 10/1979 | Bloom et al. | |
| 4,215,187 A | 7/1980 | Gnida et al. | |
| 4,603,093 A | 7/1986 | Edwards et al. | |
| 4,623,598 A | 11/1986 | Waki et al. | |
| 4,646,430 A | * 3/1987 | Clarke | 29/623.1 |
| 4,983,475 A | 1/1991 | Delans | |
| 4,997,732 A | 3/1991 | Austin et al. | |
| 5,057,385 A | 10/1991 | Hope et al. | |
| 5,154,993 A | 10/1992 | Beatty | |
| 5,187,564 A | 2/1993 | McCain | |
| 5,227,267 A | 7/1993 | Goebel et al. | |

(Continued)

FOREIGN PATENT DOCUMENTS

EP    0715867 A2    6/1996

(Continued)

*Primary Examiner*—John S. Maples
(74) *Attorney, Agent, or Firm*—Gavrilovich, Dodd & Lindsey

(57) ABSTRACT

An electrode assembly and construction method therefor for use in small high performance batteries suitable for implantable medical device applications. The electrode assembly comprises a stack of precisely aligned planar elements including alternately arranged positive and negative planar electrodes having a planar separator interposed between adjacent electrodes. Each electrode is preferably formed of a thin metal substrate carrying active material on front and rear faces. The peripheral edge of each electrode defines an active area and a tab extending therefrom. The front and rear faces of the active area each carries a layer of active material. The faces of the tab area are preferably bare. The positive electrode tabs are located at a first position along the peripheral edge whereas the negative tabs are located at a second position spaced from said first position. Each tab carries a clip to form a reinforcing strip adjacent each tab face. Alignment holes are formed in the clips and tabs.

21 Claims, 14 Drawing Sheets

U.S. PATENT DOCUMENTS

| | | | |
|---|---|---|---|
| 5,246,797 A | 9/1993 | Imhof et al. | |
| 5,264,306 A * | 11/1993 | Walker et al. | 429/160 |
| 5,326,652 A | 7/1994 | Lake | |
| 5,397,659 A | 3/1995 | Imhof et al. | |
| 5,405,715 A | 4/1995 | Dawson et al. | |
| 5,456,813 A | 10/1995 | Grange-Cossou et al. | |
| 5,478,668 A | 12/1995 | Gozdz et al. | |
| 5,522,851 A | 6/1996 | Fayram | |
| 5,558,681 A | 9/1996 | Loustau et al. | |
| 5,578,397 A | 11/1996 | Verhoog et al. | |
| 5,637,418 A | 6/1997 | Brown et al. | |
| 5,667,915 A | 9/1997 | Loustau et al. | |
| 5,747,191 A | 5/1998 | Lake | |
| RE36,102 E * | 2/1999 | Dougherty | 429/160 |
| 6,004,694 A | 12/1999 | Van Lerberghe | |
| 6,025,089 A | 2/2000 | Lake | |
| 6,045,946 A | 4/2000 | Maggert et al. | |
| 6,106,973 A | 8/2000 | Sonozaki et al. | |
| 6,137,673 A | 10/2000 | Andou et al. | |
| 6,174,338 B1 | 1/2001 | Heller, Jr. | |
| 6,242,128 B1 * | 6/2001 | Tura et al. | 429/161 |
| 6,251,537 B1 | 6/2001 | Kim et al. | |
| 6,284,408 B1 | 9/2001 | Akazawa et al. | |
| 6,285,492 B1 | 9/2001 | Good et al. | |
| 6,294,288 B1 | 9/2001 | Gross | |
| 6,296,967 B1 | 10/2001 | Jacobs et al. | |
| 6,337,154 B1 | 1/2002 | Jacobs et al. | |
| 6,348,283 B1 | 2/2002 | Mas et al. | |
| 6,376,124 B1 | 4/2002 | Dodgson et al. | |
| 6,395,043 B1 | 5/2002 | Shadle et al. | |
| 6,413,666 B1 | 7/2002 | Oya | |
| 6,428,934 B1 | 8/2002 | Hatazawa et al. | |
| 6,432,574 B1 | 8/2002 | Suzuki et al. | |
| 6,432,577 B1 | 8/2002 | Shul et al. | |
| 6,440,603 B1 | 8/2002 | Heller, Jr. | |
| 6,440,604 B1 | 8/2002 | Inoue et al. | |
| 6,617,823 B2 | 9/2003 | O'Connell | |
| 6,627,347 B2 | 9/2003 | Fukuda et al. | |
| 2001/0031395 A1 | 10/2001 | Fukada et al. | |
| 2001/0038938 A1 | 11/2001 | Takahashi et al. | |
| 2001/0041288 A1 | 11/2001 | Onishi et al. | |
| 2001/0051298 A1 | 12/2001 | Hanafusa et al. | |
| 2002/0010998 A1 | 1/2002 | Komatsu | |
| 2002/0160263 A1 | 10/2002 | Corrigan et al. | |

FOREIGN PATENT DOCUMENTS

| | | |
|---|---|---|
| EP | 0715867 A3 | 2/1998 |
| EP | 1 146 580 A3 | 9/2002 |
| JP | 63004562 A2 | 1/1988 |
| JP | 2002056839 A2 | 2/2002 |

* cited by examiner

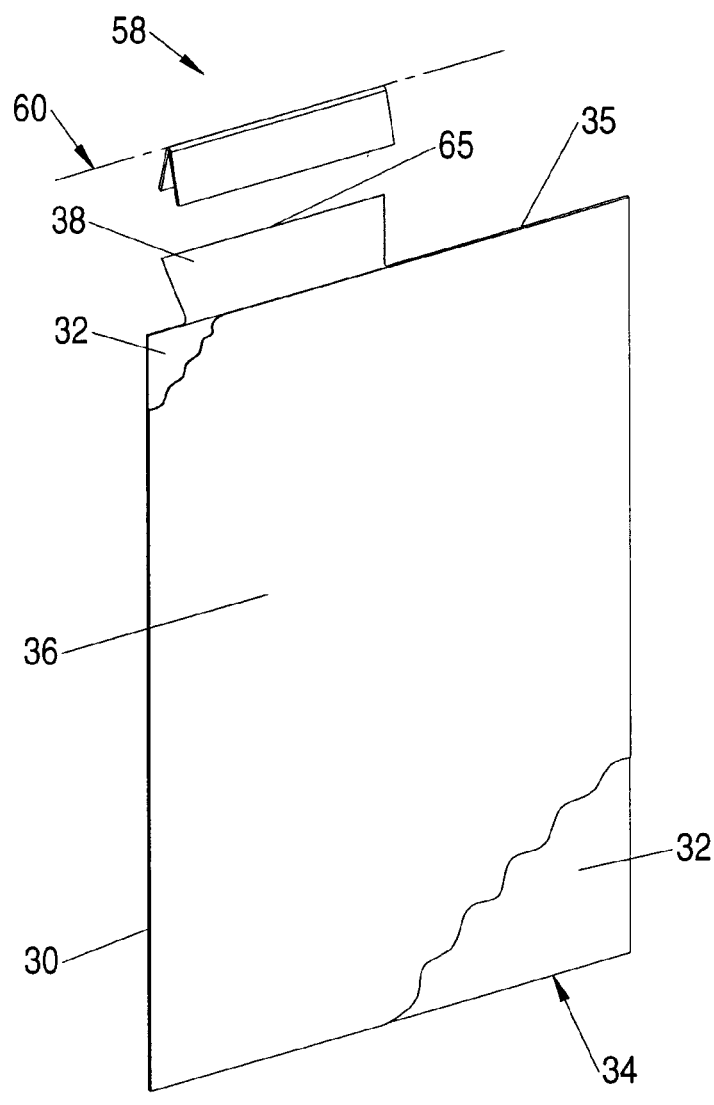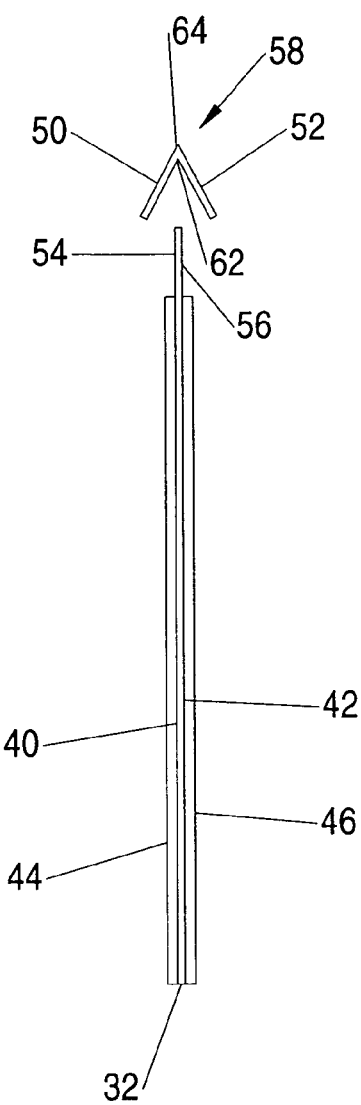
FIG. 2A
FIG. 2B

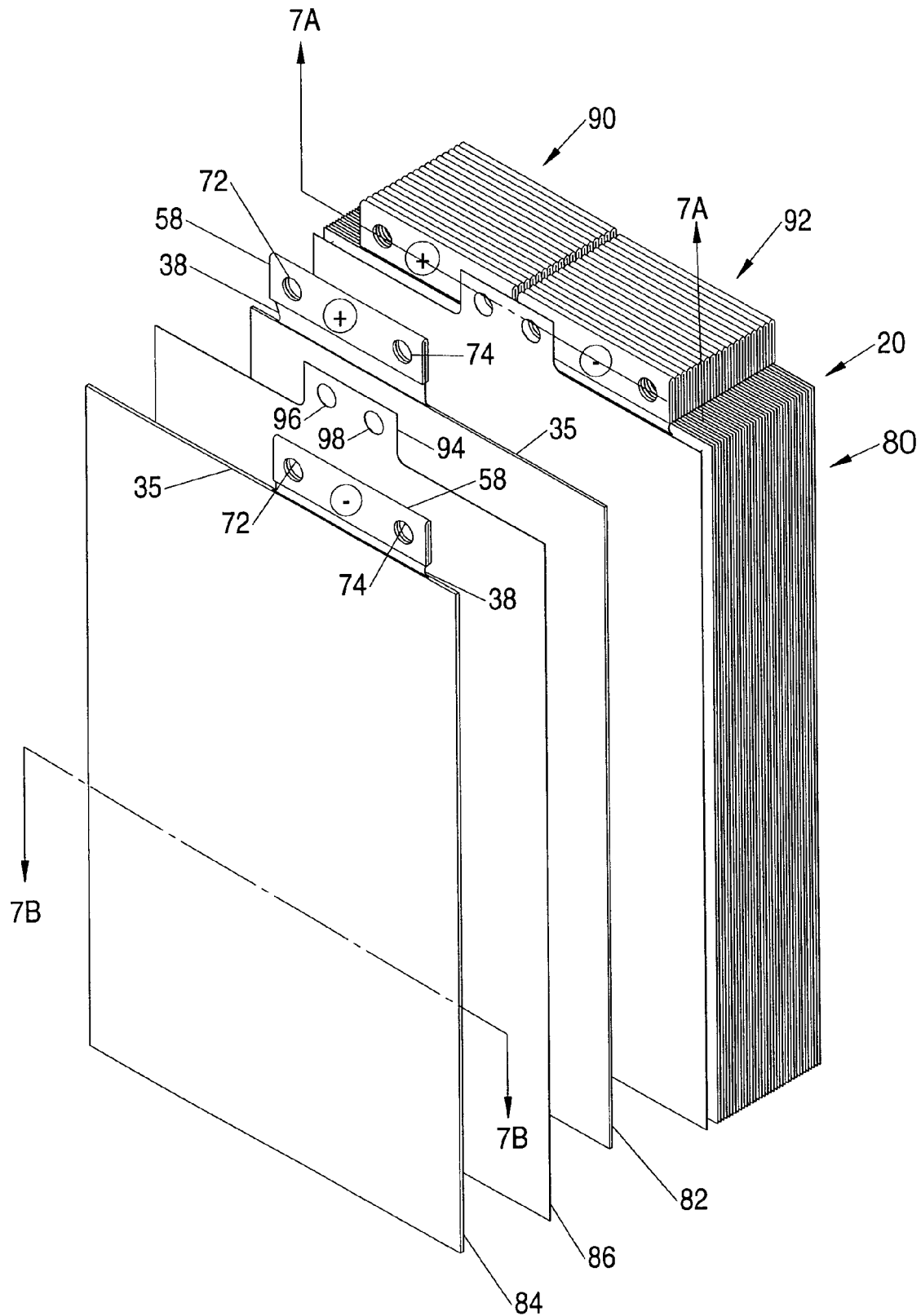
FIG. 6 STACK

BATTERY ELECTRODE ASSEMBLY AND FABRICATION METHOD THEREFOR

REFERENCE TO RELATED APPLICATIONS

This Application claims the benefit of U.S. Provisional Patent Application Ser. No. 60/447,802, filed on Feb. 14, 2003, entitled "Battery Electrode Assembly and Fabrication Method Therefor."

FIELD

This invention relates generally to batteries suitable for use in implantable medical devices and more particularly to an electrode assembly configured for use in such batteries and a method for fabricating such an assembly.

BACKGROUND

A variety of implantable battery operated medical devices are available and/or under development for treating a wide range of physiological insufficiencies. Such devices uniformly require batteries which are small, light, safe, and reliable. It is additionally generally important that the batteries exhibit a high energy density and that they be amenable to implementation in a wide range of shapes and sizes to best utilize the space available in a medical device housing. Other applications in which size, safety, and reliability are desirable include aerospace and hybrid electric vehicle applications.

A significant challenge in battery design and construction is to provide an electrode assembly which can be readily manufactured and whose attributes are consistent with a battery implementation possessing the aforementioned characteristics.

The prior art reveals an abundance of electrode assembly configurations for use in batteries including configurations of stacked planar electrodes and configurations of rolled sheet electrodes. A typical stacked electrode design comprises a multiplicity of planar layers including positive electrodes (+), negative electrodes (−), and separator sheets (s) stacked in an exemplary sequence as follows: −, s, +, s, −, s, +, s, etc. Stacked electrode configurations frequently use tabs extending from the positive electrodes which are electrically interconnected to form a positive current collector. Similarly, tabs extending from the negative electrodes are electrically interconnected to form a negative current collector. The positive and negative current collectors are generally connected to first and second terminals extending externally of the battery case. In some configurations, the battery case functions as one of the external terminals.

Although known stacked electrode configurations using tabs may be suitable for use in certain applications, significant challenges are encountered when attempting to use such configurations for medical applications having small size and high energy density requirements. For example, stacked electrodes with tabs generally consume, or waste, headspace within the battery case. Thus, the energy density of a battery using conventional stacked and tabbed electrodes is constrained by the wasted headspace. Moreover, some conventional stacked designs do not lend themselves to easy fabrication and as a result manufacturing costs can be relatively high and reliability problems can be encountered.

SUMMARY

The present invention is directed to an enhanced electrode assembly, and construction method therefore, intended for use in small high performance batteries suitable for implantable medical device applications.

An electrode assembly in accordance with the invention is characterized by a stack of precisely aligned planar elements including alternately arranged positive and negative planar electrodes and wherein a planar separator is interposed between adjacent electrodes. Each electrode is preferably preformed of a thin metal substrate carrying active material on front and rear substrate faces. As an example, a positive electrode may typically comprise an aluminum substrate having a thickness of 10 to 30 microns, preferably 20 to 30 microns, and carry positive active material on each substrate face having a thickness of 30 to 120 microns. Similarly, a negative electrode may typically comprise a titanium substrate having a thickness of 5 to 20 microns, preferably 5 to 12 microns with negative active material on each face thereof having a thickness of 30 to 120 microns. Each separator interposed between adjacent electrodes typically has a thickness of 20 to 30 microns. The planar elements, i.e., positive and negative electrodes and separators, have peripheral edges which are substantially identically shaped and similarly dimensioned.

In accordance with an important aspect of a preferred embodiment, the peripheral edge of each electrode substrate defines an active area and a tab extending therefrom. The front and rear faces of the active area each carries a layer of active material. The faces of the tab area are preferably bare. The positive electrode tabs are all located at a first position along the peripheral edge whereas the negative electrode tabs are all located at a second position spaced from said first position.

In accordance with a further important aspect of the preferred embodiment, each of the bare substrate tabs carries a clip, i.e., a planar metal piece folded around the outer tab edge, to form a reinforcing strip adjacent each tab face. In assembly, each clip is crimped over the tab, and optionally welded thereto, to provide tab mechanical reinforcement as well as electrical continuity from the electrode substrate to the clip. Each clip and its captured tab is trimmed to define a reference edge and pierced to form first and second alignment holes spaced from the edge extending through the clip and tab.

During assembly of the electrode stack, the clip/tab alignment holes are used in conjunction with registration pins to precisely align the multiple planar electrodes and separators. More particularly, the positive electrode alignment holes are fitted onto a first pair of registration pins and the negative electrode alignment holes are fitted onto a second pair of registration pins. The pins can either be removed prior to final assembly or can remain in the finished stack to maintain alignment and provide additional fastening. Various pin configurations can be used, including, for example, expandable tubular fasteners.

Each separator preferably also has a tab extending from its peripheral edge. The separator tab is pierced to form two alignment holes. During assembly of the electrode stack, a separator panel is interposed between adjacent electrodes with a first separator alignment hole aligned with one of the positive electrode alignment holes and a second separator alignment hole aligned with one of the negative electrode alignment holes.

Thus, in the assembled electrode stack, the positive electrode clips are aligned to form a positive clip column.

Similarly the negative electrode clips are aligned to form a negative clip column which extends parallel to, but spaced from, the positive clip column. The tabs of the interposed separators laterally bridge the positive and negative clip columns. Compression of the respective clip columns acts to pinch and hold the separator tabs to rigidify the entire stack. In accordance with an important aspect of a preferred embodiment, the clip thickness dimension is selected so that each clip in a column abuts adjacent clips in the same column. This arrangement enables the clips in each column to be readily welded together to provide excellent electrical interconnections and mechanical rigidity.

Electrode assemblies in accordance with the invention can be fabricated in a wide range of shapes and sizes. Although the exemplary electrode assembly described in detail hereinafter is configured to fit within a rectangular prism battery case, other assembly embodiments can be readily configured to conform to other case shapes.

BRIEF DESCRIPTION OF THE FIGURES

FIG. 2A is an isometric view of a planar electrode in accordance with the invention having a substrate tab adapted to receive a clip thereon;

FIG. 2B is an end view of the planar electrode of FIG. 2A;

FIG. 6 is an isometric exploded view of an electrode stack in accordance with the invention showing how positive and negative electrodes and separators are sequenced to form the stack;

DETAILED DESCRIPTION

Figure 1:
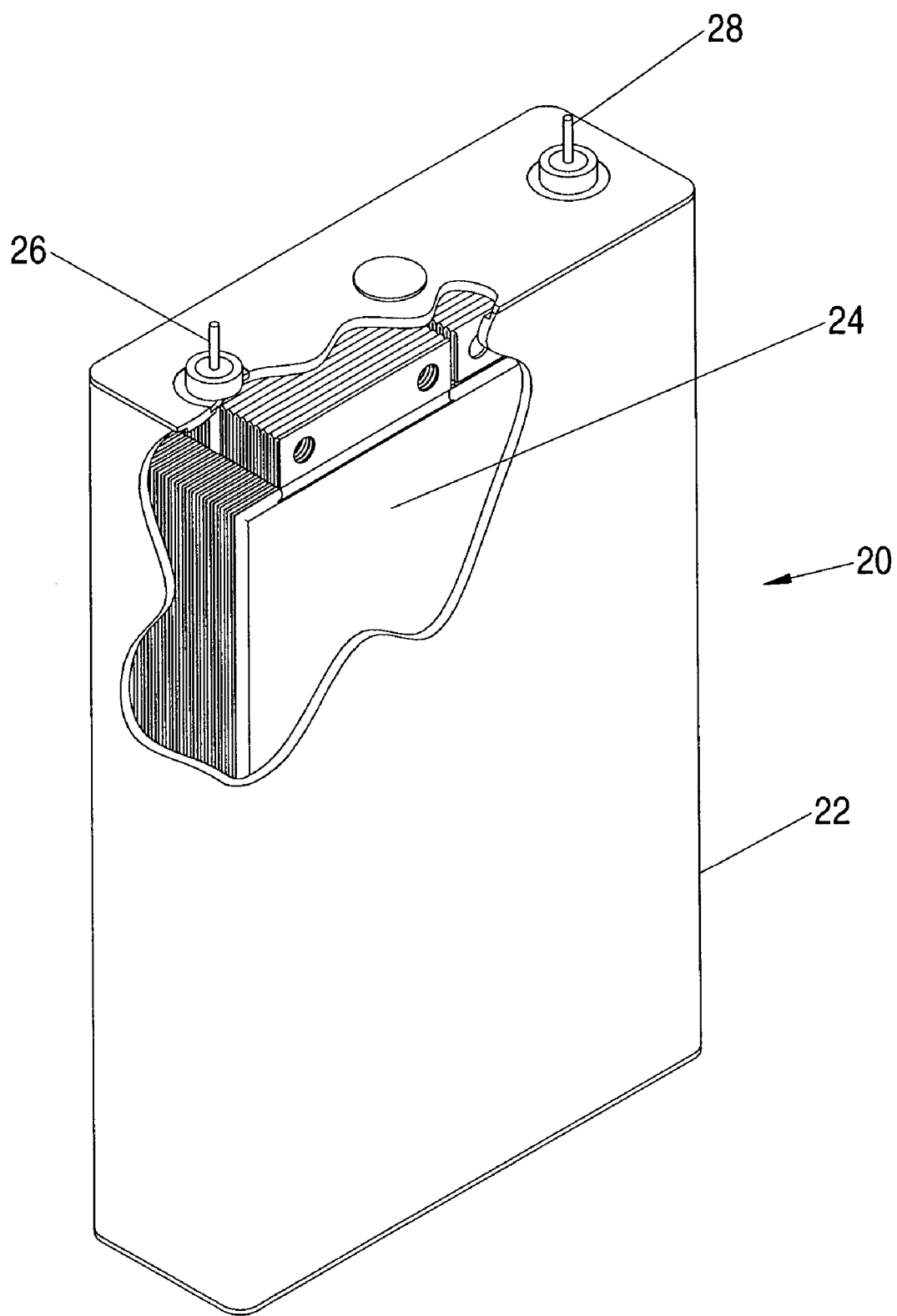
FIG. 1 is an isometric view, partially broken away, showing a battery in accordance with the present invention.

Attention is initially directed to FIG. 1, which illustrates a battery 20 having a case 22 which is shown partially broken away, to reveal an interior volume containing an electrode assembly 24. FIG. 1 also illustrates battery terminals 26 and 28 extending from the assembly 24 in the case interior volume to the case exterior for supplying power to an electric load (not shown). The depiction of the battery 20 in FIG. 1 is generally representative of prior art battery constructions to the extent it employs a sealed case 22 to house an electrode assembly 24 and a suitable electrolyte (not shown) together with terminals 26 and 28 extending from the case interior volume through the case wall. The present invention is primarily directed to an enhanced electrode assembly structure and a method for fabricating that structure. An electrode assembly in accordance with the present invention can be utilized in conjunction with various known battery chemistry technologies but, for convenience hereinafter, the described preferred embodiment will be assumed to utilize lithium ion battery chemistry.

Batteries using an electrode assembly comprising stacked planar elements are well known in the art. Such known stacked assemblies typically comprise a plurality of planar positive electrodes and a plurality of planar negative electrodes stacked in an alternating sequence with planar separators interposed between adjacent electrodes. Embodiments of the present invention employ a corresponding sequence of planar elements to form an electrode assembly stack but introduce innovations to enhance battery performance, e.g., energy density, enhance reliability, and safety, and provide a convenient fabrication method at reasonable cost to yield small batteries suitable for demanding applications, e.g., for use in implantable medical devices.

Attention is initially directed to FIG. 2A which illustrates a planar electrode 30 for use in an electrode assembly 24 in accordance with the present invention. The electrode 30 comprises a metal substrate 32 which may, for example, comprise aluminum foil for a positive electrode and titanium foil for a negative electrode. Suitable alternative substrate materials are discussed in the literature. A positive electrode substrate 32 typically has a thickness in the range of 10 to 30 microns, whereas a negative electrode substrate more typically has a thickness in the range of 5 to 20 microns. The substrate 32 is initially cut to define a peripheral edge 34 which bounds an active area 36 and a tab 38 extending from the active area 36. The substrate 32 also defines a front face 40 and a rear face 42. Active material layers 44 and 46 are respectively applied to the front and rear faces 40 and 42 of the substrate active area 36. The tab 38 is left bare. The thickness of each active material layer is typically within the range of 30 to 120 microns.

In accordance with the invention, metal reinforcing strips 50 and 52 are respectively attached to the front and rear faces 54, 56 of the substrate tab 38. In accordance with the preferred embodiment the reinforcing strips 50 and 52 comprise first and second portions of an integral clip 58 bent along foldline 60. The clip 58 defines an interior foldline edge 62 and an exterior foldline edge 64. In accordance with the present invention, the clip 58 is mounted on the tab 38 with the clip interior foldline edge 62 proximate to the tab outer edge 65. After mounting, the clip 58 is crimped onto the tab 38 (FIG. 3) with the clip portions 50 and 52 abutting, i.e., in direct contact with the faces 54, 56 of tab 38. After crimping, the clip 58 and underlying tab 38 are trimmed (FIG. 4) to define a reference edge 70.

Figure 4:
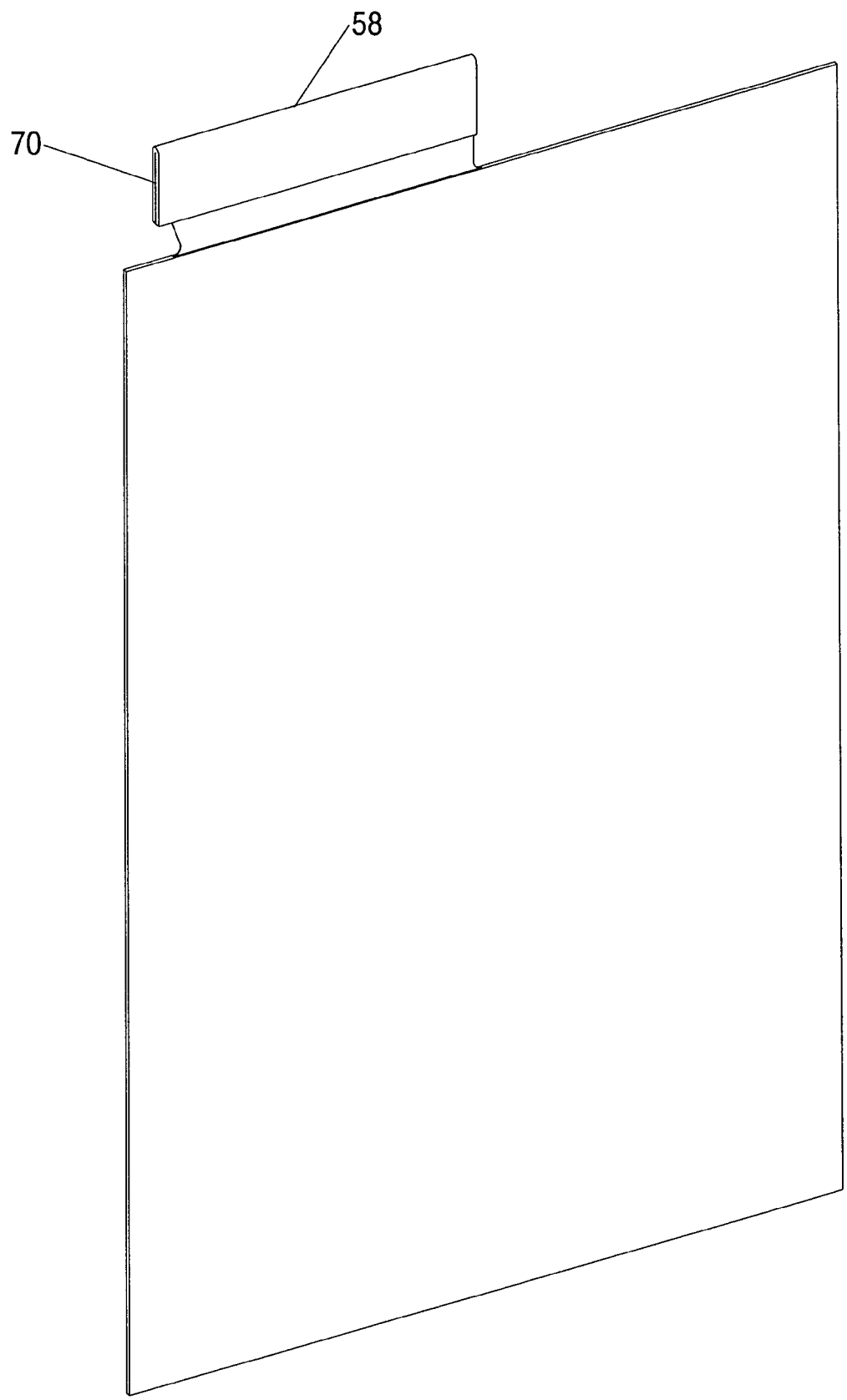
FIG. 4 is an isometric view similar to FIG. 3 showing the clip and tab after being trimmed to form a reference edge.
Figure 5:
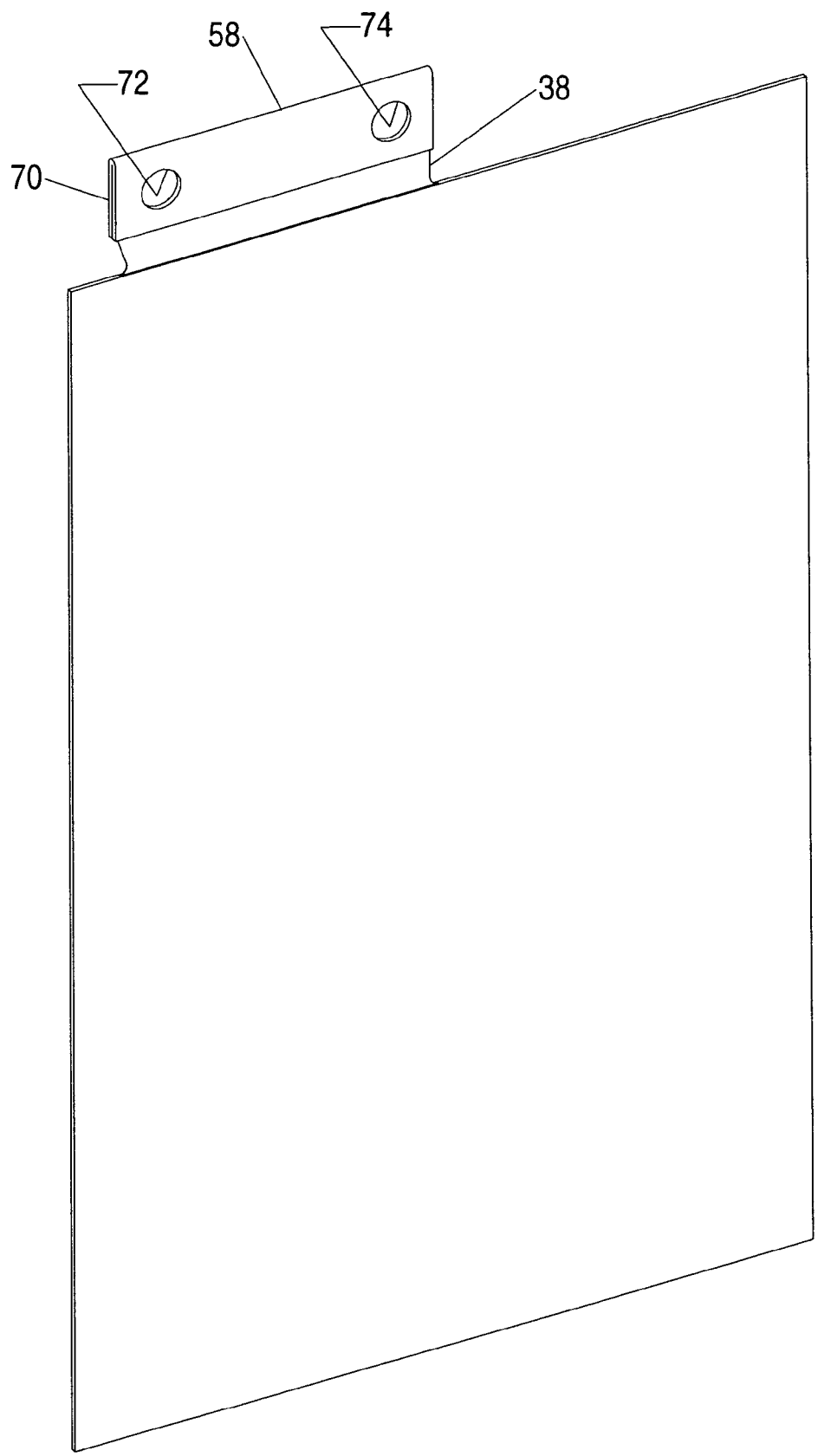
FIG. 5 is an isometric view similar to 4 showing the clip and tab after piercing to form two alignment holes.

After or concurrent with the trimming step represented in FIG. 4, the strip portions 50, 52 of the clip 58 and the underlying tab 38 are pierced in FIG. 5 to define spaced alignment holes 72 and 74 which are precisely referenced to reference edge 70. Although they can be performed sequentially, the trimming step and piercing step preferably occur simultaneously.

It is pointed out that the electrode 30 depicted in FIGS. 2–5 shows a tab 38 located left of center along peripheral edge portion 35. As will be discussed hereinafter in connection with FIG. 6, positive and negative electrodes are alternately stacked with all of the positive electrodes having tabs located left of center along peripheral edge portion 35 and all of the negative electrodes having tabs located right of center along peripheral edge portion 35.

More particularly, attention is now directed to FIG. 6, which illustrates the manner of stacking positive and negative electrodes and separators in accordance with the present invention to form an electrode assembly 20. More particularly, FIG. 6 illustrates a stack of planar elements 80 in which positive electrodes 82 are alternately stacked with negative electrodes 84 and in which planar separators 86 are interposed between each pair of adjacent electrodes.

Particularly note in FIG. 6 that positive electrode 82 is depicted as in FIG. 5 having a tab 38 with a reinforcing clip 58 thereon. The clip 58 and underlying tab have first and second alignment holes 72, 74 formed therein. Note in FIG. 6 that the tabs 38 and clips 58 of all of the positive electrodes are aligned and form what may be referred to as a positive tab/clip column 90.

Whereas the tabs on the positive electrodes 82 are depicted as left of center along peripheral edge portion 35, the negative electrodes 84 are shown with tabs 38' and clips 58' which are located right of center along peripheral edge portion 35'. Note that the clips 58' also have first and second spaced alignment holes 72' and 74'. The tabs and clips of the negative electrodes in stack 80 are aligned along what may be referred to as a negative tab/clip column 92 extending parallel to and spaced form the column 90.

As shown in FIG. 6, the separators 86 define a centrally located tab 94 defining spaced alignment holes 96 and 98. The tab 94 is intended to laterally bridge the spacing between the columns 90 and 92 in the stack 80. More particularly, the tab 94 alignment holes 96 and 98 are intended to respectively align with the inner alignment holes of the positive and negative electrode tabs. That is, separator alignment hole 96 is intended to align with positive electrode alignment hole 74 and separator alignment hole 98 is intended to align with negative electrode alignment hole 72' in the stack 80 as depicted in FIG. 6.

Figure 7A:
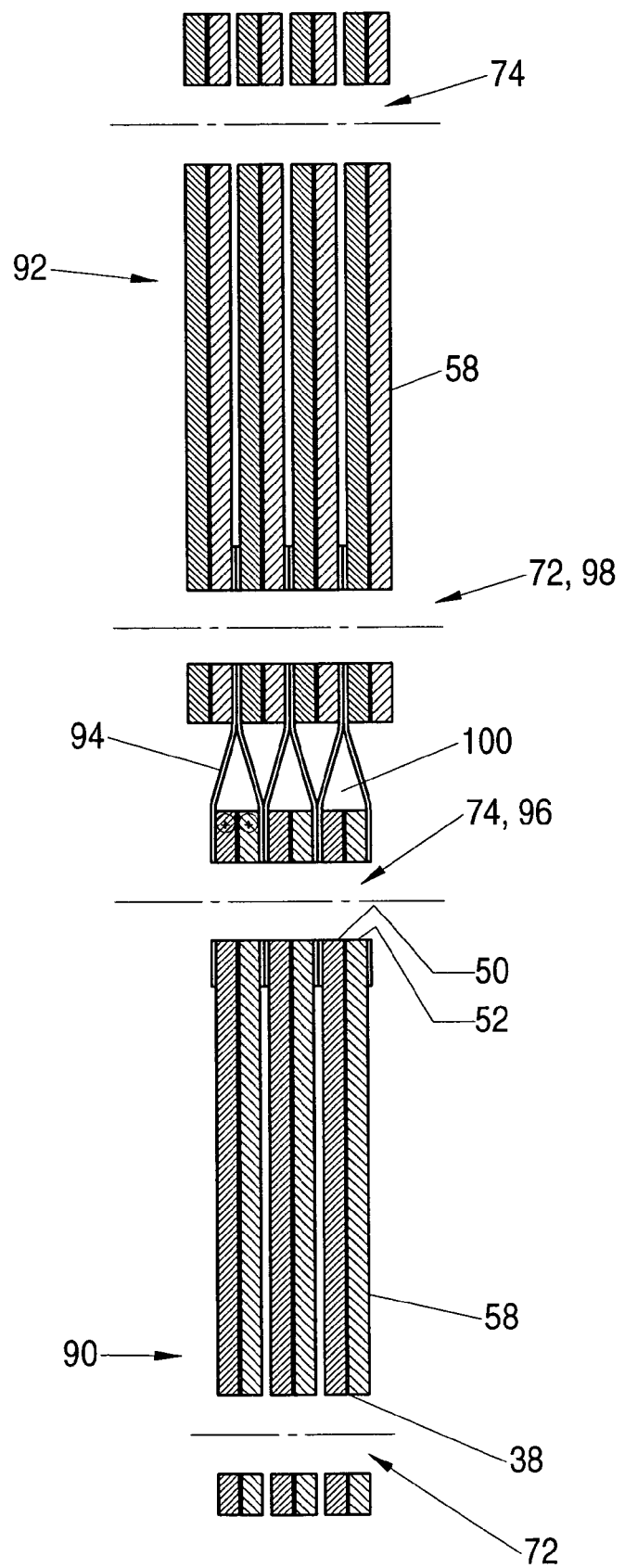
FIG. 7A is a sectional view taken substantially along the plane 7A—7A of FIG. 6.

Attention is now directed to FIG. 7A which shows a horizontal cross section through the tabs and clips of the stack 80 of FIG. 6. The positive column 90 comprises multiple clips 58 each mounted on a different positive electrode tab 38. Each clip defines reinforcing strips 50, 52 dimensioned so that adjacent clips substantially abut one another. More particularly, each clip preferably has a thickness equal approximately to the sum of the thickness of a positive electrode plus a negative electrode plus two separators. This enables adjacent clips in the positive column 90 to confront and abut one another.

The negative column 92 is depicted similarly to column 90 and it, too, comprises clips that are dimensioned to substantially abut one another. It is important to recognize however that FIG. 7A also depicts the separator tabs 94 interposed between and bridging the columns 90 and 92. Note particularly that the separator tabs 94 extend somewhat diagonally between the alignment holes 96 and 98 because the positive and negative electrodes are alternately stacked. That is, as can be seen in FIG. 6, the portion of the separator tab 94 around alignment hole 96 bears against the portion of clip 58 around alignment hole 74. However, the portion of the same tab 94 around alignment hole 98 bears against the portion of clip 58' around alignment hole 72' of an adjacent negative electrode 84. Since the positive electrodes and negative electrodes are stacked, i.e., layered and thus misaligned, the tab 94 bends essentially diagonally as shown in FIG. 7A. As a consequence of this diagonal bending, adjacent separator tabs 94 form a V shape 100, which acts to lock and prevent the relative lateral movement of any of the tabs and clips. It is also pointed out that the separator tab 94 assists in holding together the interleaved positive and negative electrodes. That is, the welded positive electrode tabs secure together a substack of positive electrodes and the welded negative electrode tabs secure together a substack of negative electrodes. Inasmuch as the separator tabs 94 are captured between clips of both the positive and negative clip columns, the separators additionally function to add rigidity to the stack and prevent any relative lateral movement.

Figure 7B:
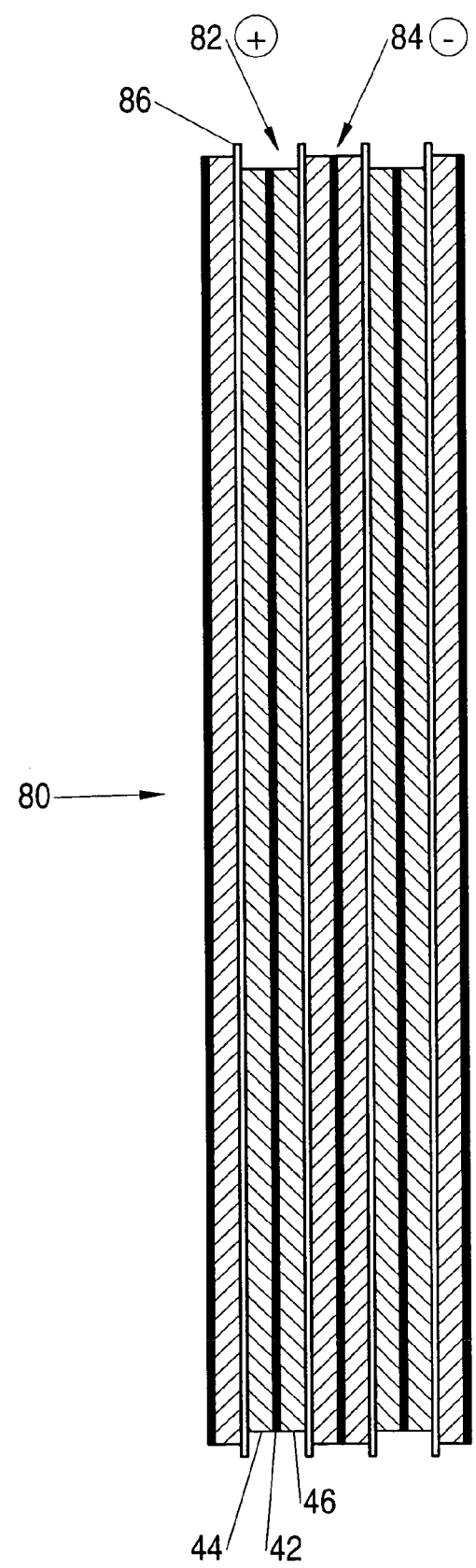
FIG. 7B is a sectional view taken substantially along the plane 7B—7B of FIG. 6.

FIG. 7B depicts a cross section of the stack 80 showing separators 86, positive electrodes 82, and negative electrodes 84. Note that FIG. 7B also depicts how each of the electrodes comprises a substrate 42 having active material layers 44, 46 on respective faces thereof as previously shown in FIG. 2B.

Figure 9:
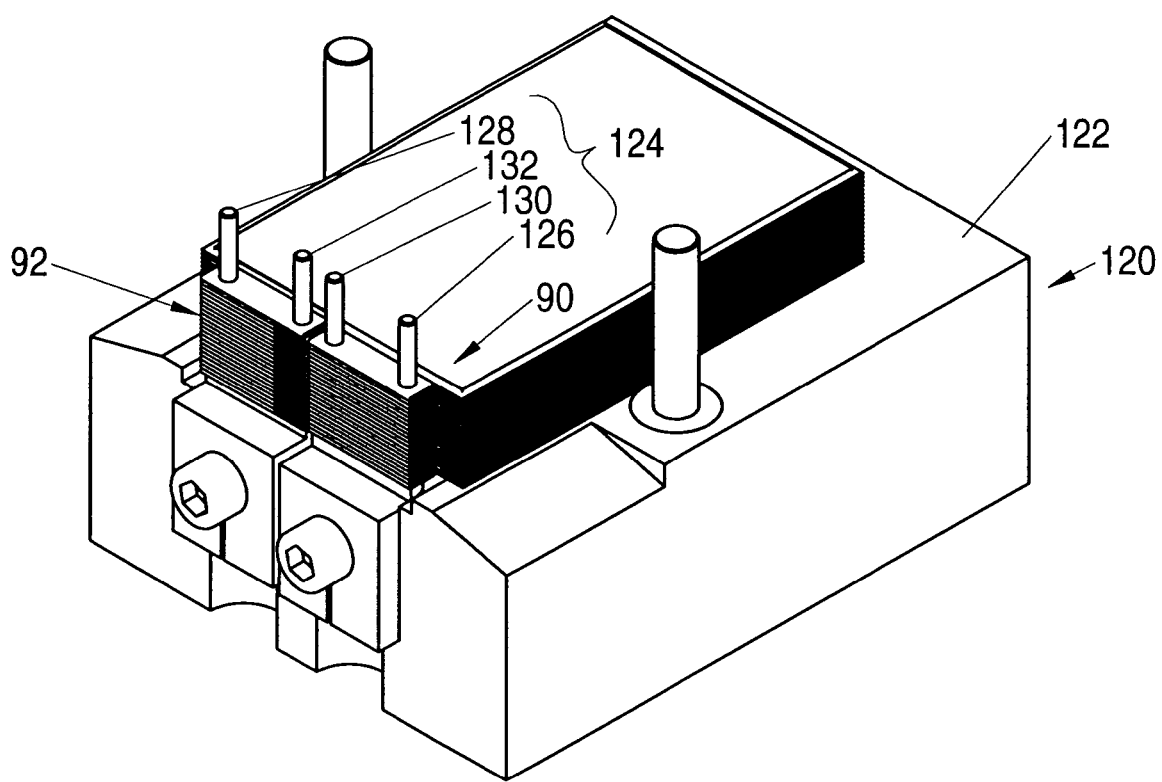
FIG. 9 is an isometric view depicting a typical stacking fixture used to assemble the stack of FIG. 6.

In order to stack the positive and negative electrodes and separators in precise alignment, it is preferable to use registration pins in combination with the aforementioned alignment holes. FIG. 9 illustrates an exemplary stacking fixture 120 having a stacking base 122 and a plurality of fixedly positioned alignment or registration pins 124. The pins 124 include outer pins 126 and 128 and inner pins 130 and 132. The alignment pins 124 are fixedly located and spaced relative to one another so that the positive and negative electrodes and separators can be precisely stacked thereon. Thus for example, pin 126 is intended to extend through positive electrode alignment holes 72, pin 130 through positive electrode alignment holes 74 and separator alignment holes 96, pin 132 through negative electrode alignment holes 72' and separator alignment holes 98, and pin 128 through negative electrode alignment holes 74'.

The stacking fixture in FIG. 9 enables the clips of the positive column 90 to all be secured together, as for example by laser welding. Similarly, the clips of negative column 92 can also be secured together, as by laser welding. The registration pins can be removed from the stack prior to final assembly, or alternately they can remain in the finished stack to enhance rigidity. Various pin configurations can be used, particularly including fasteners which can be locked in place as by diameter expansion. In the final assembly of the battery when the electrode assembly is mounted in case 22, the respective current collectors are electrically connected to terminals 26, 28 (FIG. 1).

Figure 8A:
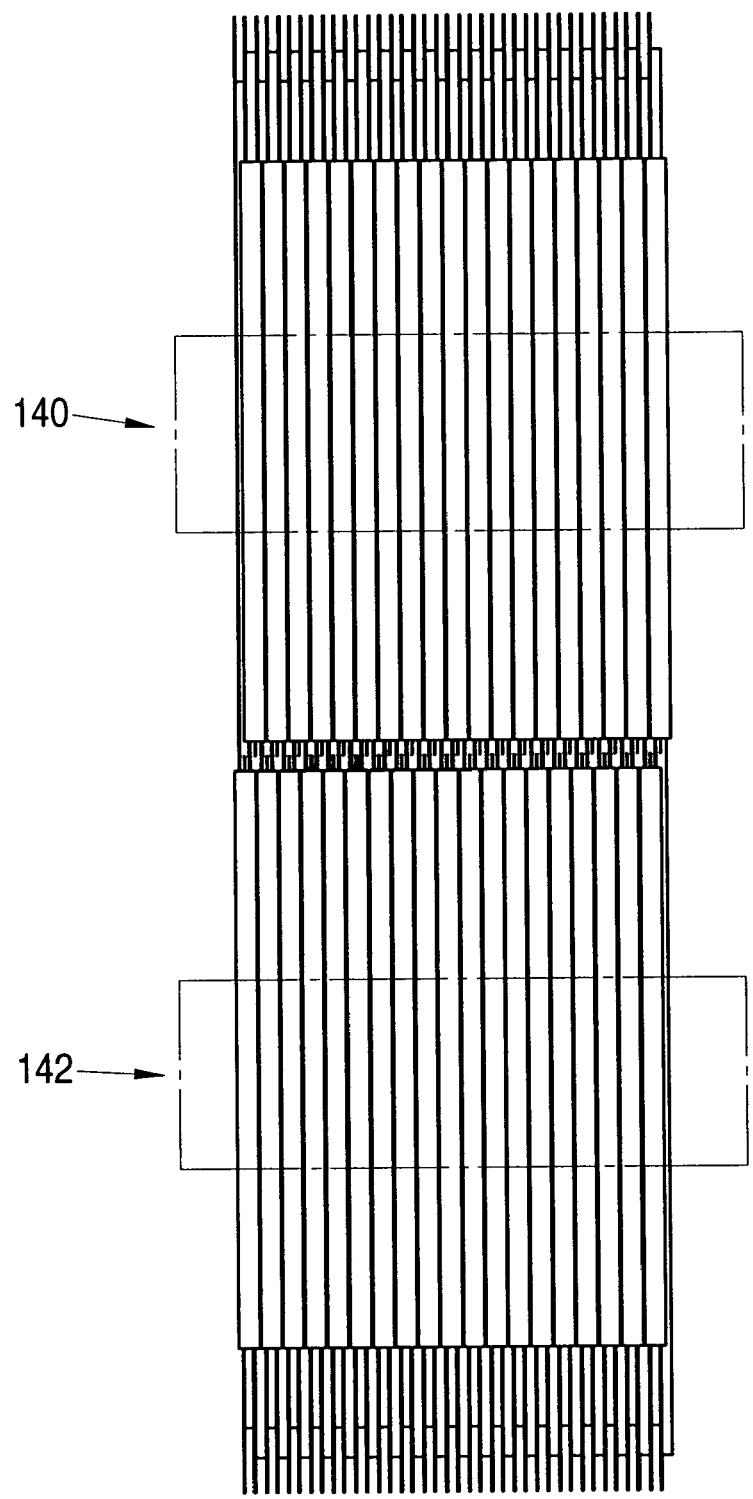
FIG. 8A is a top view of a portion of the stack of FIG. 6 showing preferred top weld areas.
Figure 8B:
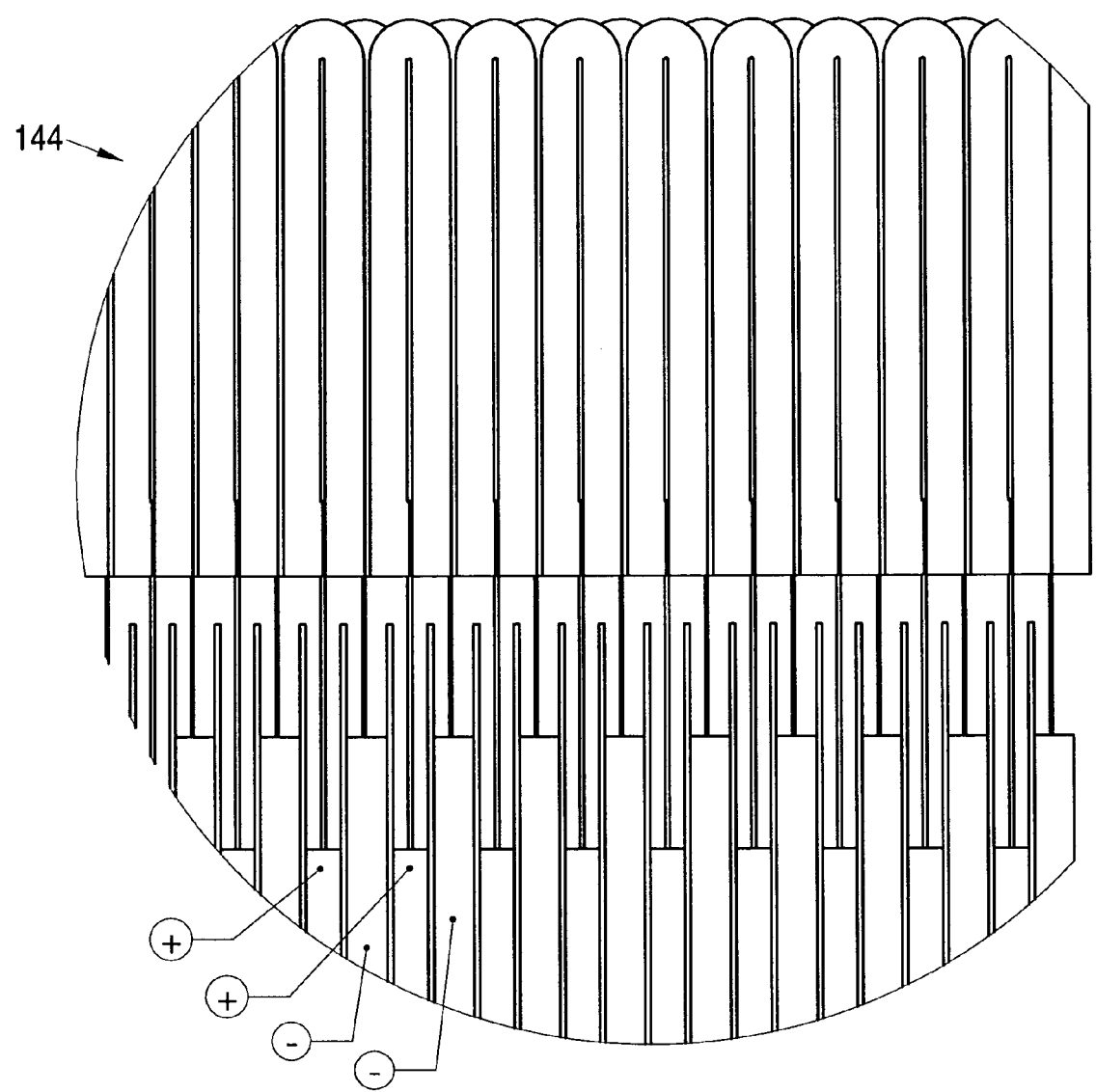
FIG. 8B is a fragmentary end view of the upper portion of the stack of FIG. 6 showing a preferred side weld area.

FIG. 8A illustrates a top view of the stack as viewed in FIG. 6 and shows areas 140 and 142 extending along the tops of the clips on which welds can formed to secure each column of clips both mechanically and electrically. FIG. 8B depicts a side view of the tab/clip portion of the stack showing an area 144 incorporating clip side ends which are also preferably welded together to secure electrical and mechanical interconnection. It should be noted that both FIGS. 8A and 8B show how each clip abuts an adjacent clip in its column to facilitate welding and to assure the fabrication of a dense stack which is able to fully utilize the interior volume of the battery case and thus maximize power density performance. As previously noted, each clip preferably has a thickness approximately equal to the sum of the thickness of one positive electrode, one negative electrode, and two separators.

Figure 10:
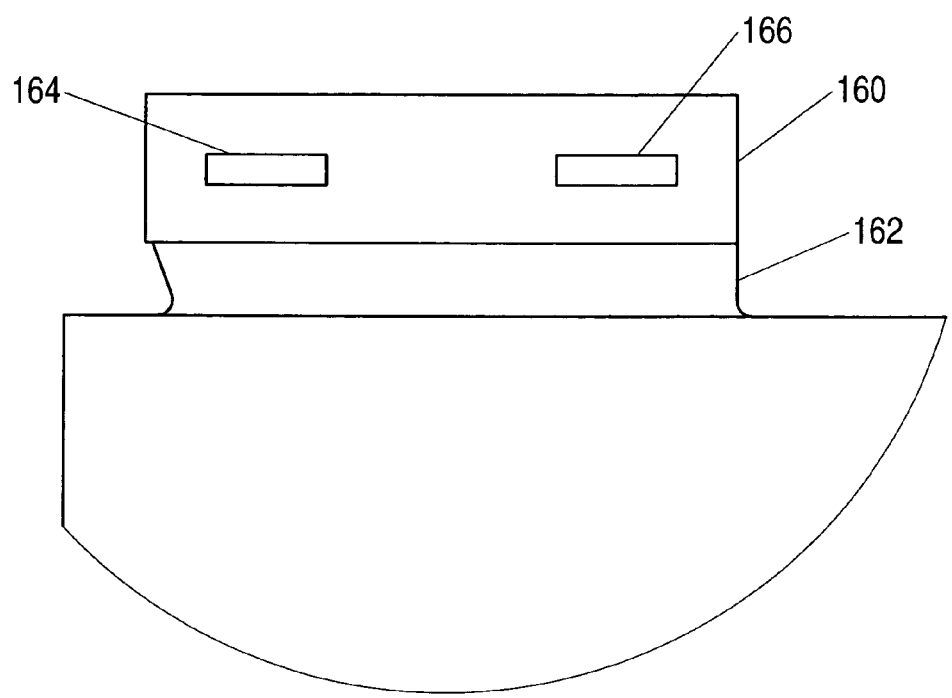
FIG. 10 is a front view of an electrode showing the use of noncircular alignment holes in the tab/clip.

Attention is now directed to FIG. 10, which illustrates an alternative clip 160 for mounting on a substrate tab 162. The embodiment of FIG. 10 differs from the embodiment of FIG. 5 in that the alignment holes 164, 166 are noncircular, e.g., rectangular. Other noncircular holes can also be used. If noncircular holes are used, positive and negative electrode registration can be achieved using only one alignment hole per clip.

Figure 3:
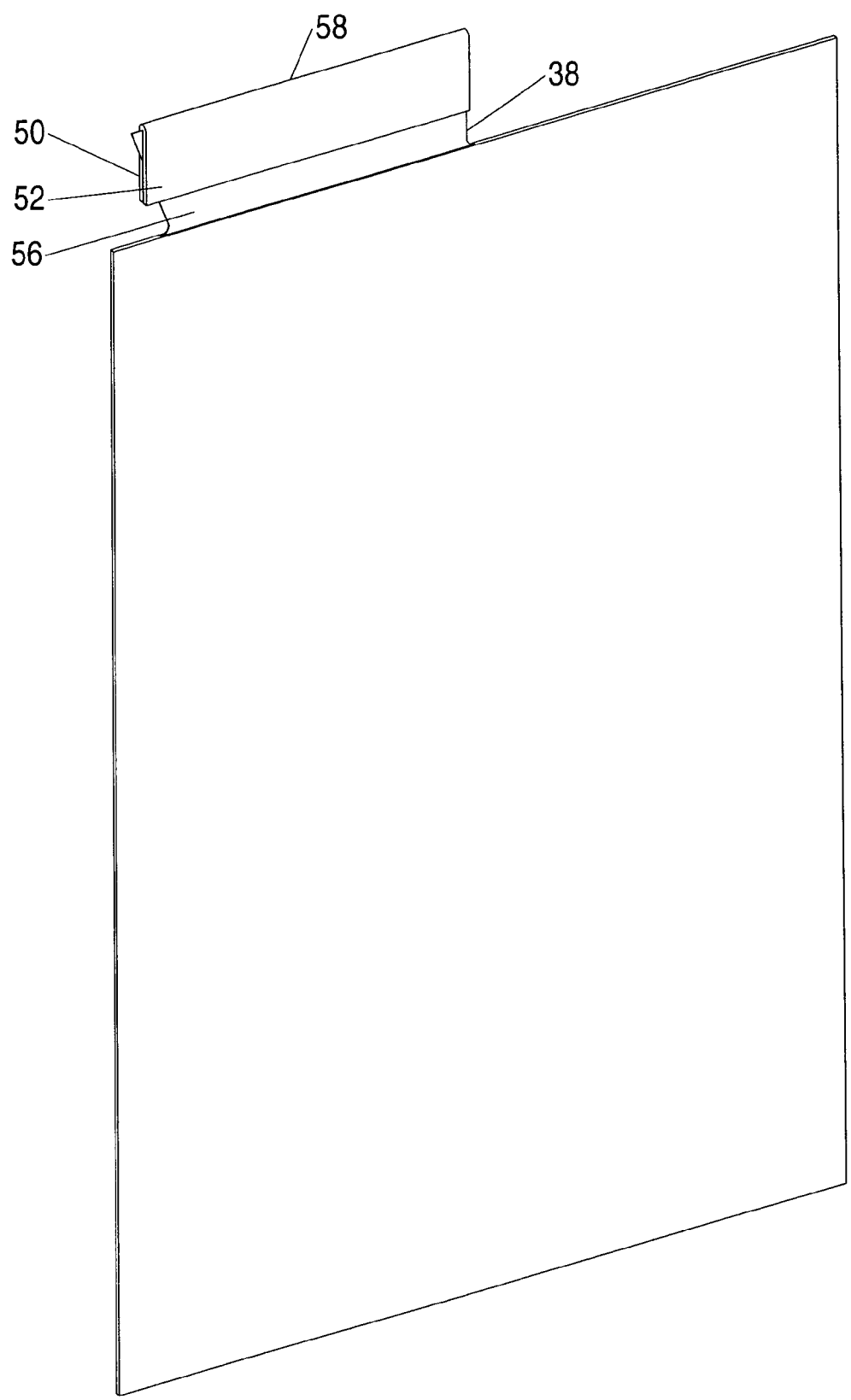
FIG. 3 is an isometric view showing the planar electrode of FIG. 2A with the clip crimped thereon.
Figure 11A:
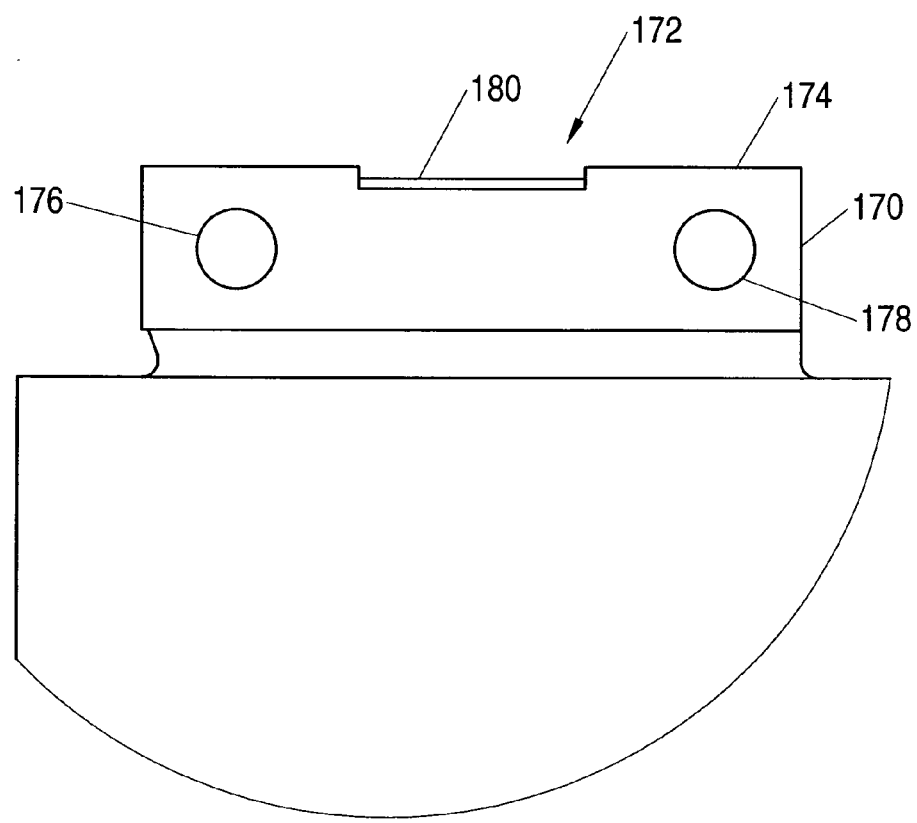
FIG. 11A is a front view showing a further alternative arrangement in which a portion of the clip is deleted to provide access to the underlying substrate for welding.
Figure 11B:
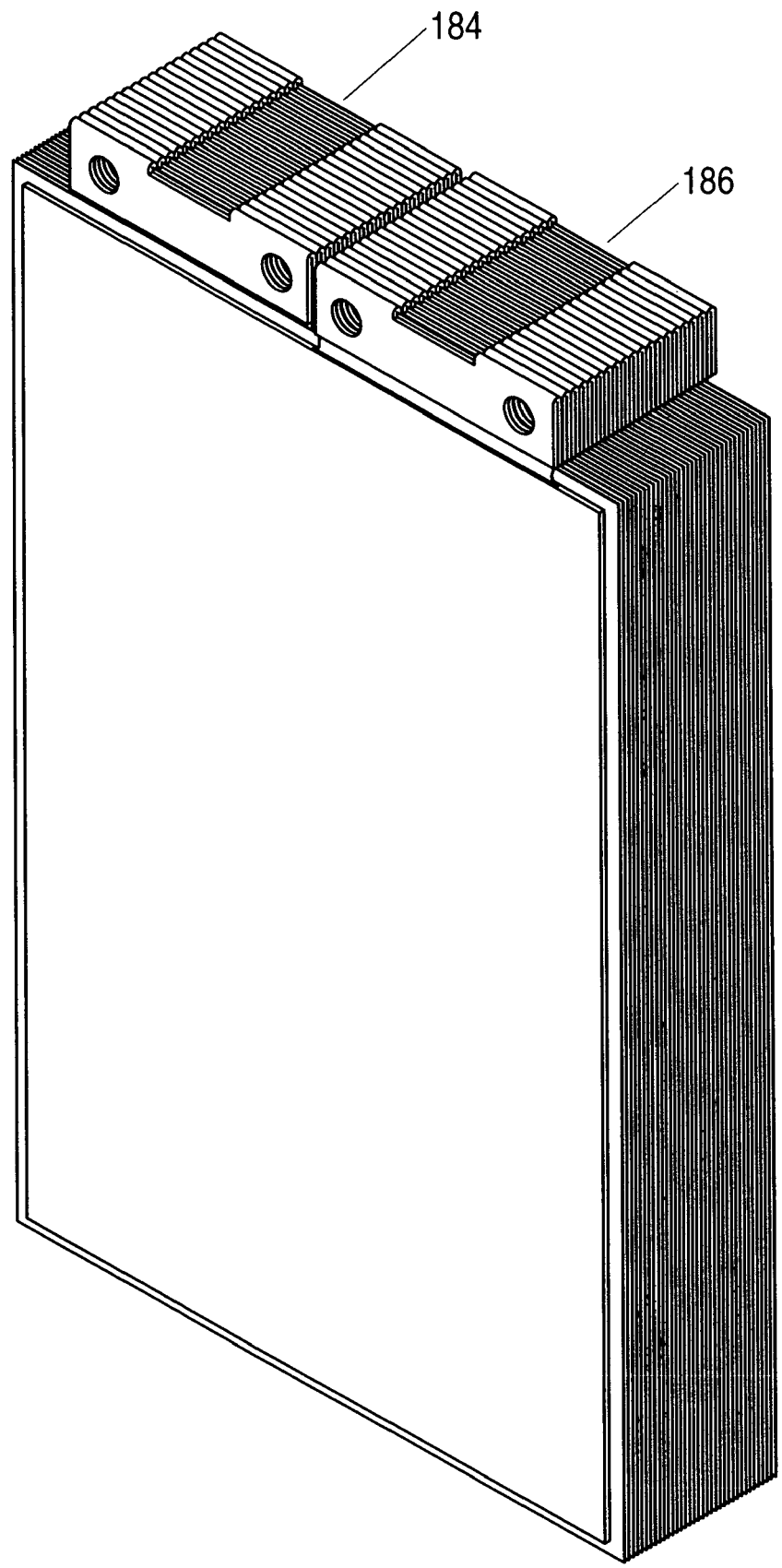
FIG. 11B is an isometric view of a stack utilizing tabs configured as shown in FIG. 11A.

Attention is now directed to FIG. 11A, which shows a modification of the clip previously shown in FIGS. 3, 4, and 5. In the clip 170 of FIG. 11A, an opening 172 is formed along the clip foldline 174 between the alignment holes 176 and 178. The opening 172 exposes a portion of the substrate 180. When the clips 170 of FIG. 11A are utilized in a stack as shown in FIG. 11B, the aligned openings 172 form slots 184 and 186 in the respective positive and negative clip/tab columns. By so exposing edge portions 180 of the substrate tabs, an enhanced weld can be produced within the slot areas 184, 186 to provide even better electrical and mechanical interconnection of the stack elements.

Figure 12:
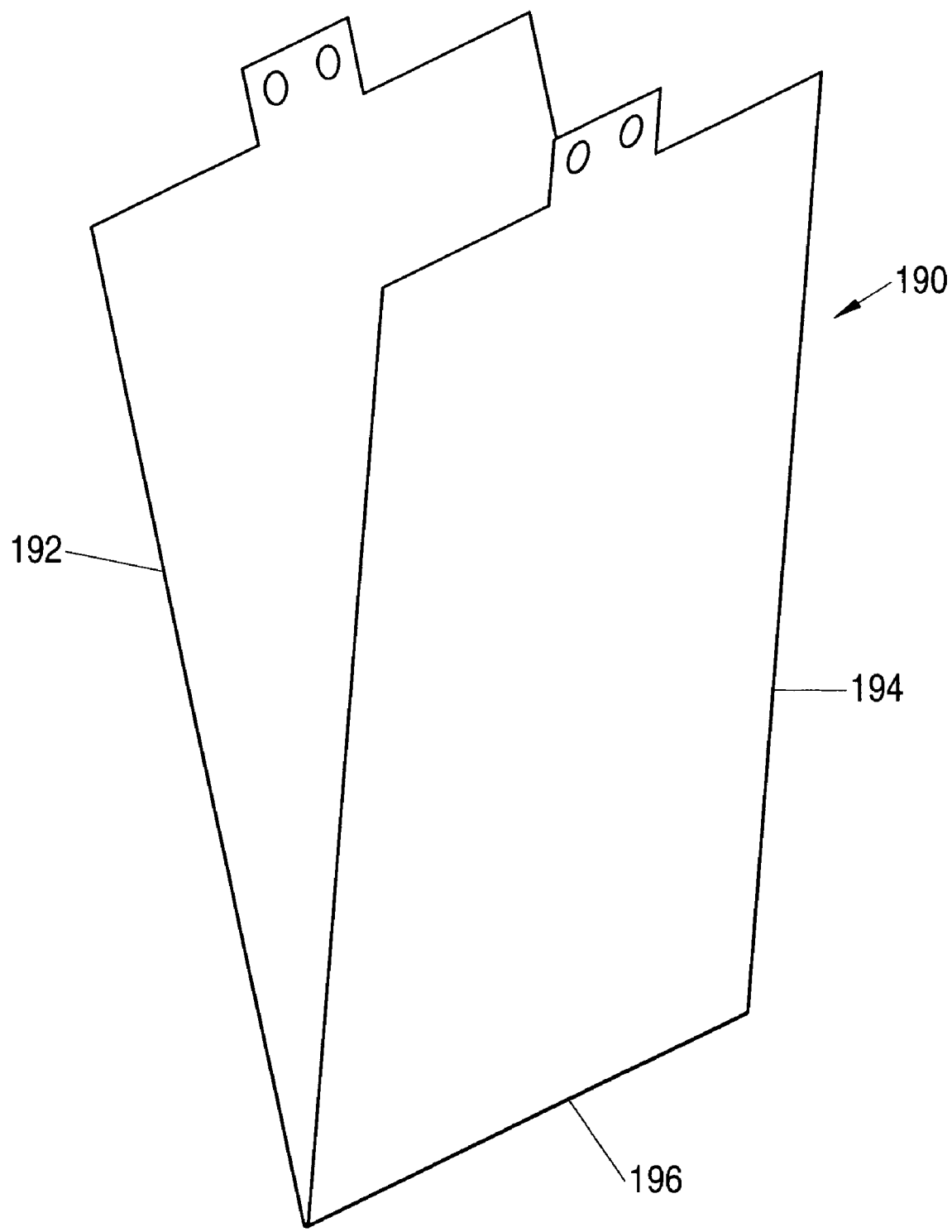
FIG. 12 is an isometric view showing an alternative two panel separator.

FIG. 12 illustrates a still further variation in which an integral two panel separator 190 is provided. More particularly, the separator 190 includes panels 192 and 194 which are bent around a foldline 196. The two panel separator 190 can be used in a stack in place of two separate separators to facilitate fabrication and further enhance electrical separation of adjacent electrodes.

From the foregoing it should now be understood that an enhanced electrode assembly and its preferred manner of fabrication in accordance with the invention have been described. Although only a limited number of specific preferred implementations have been disclosed, it should be recognized that insubstantial modifications and equivalents will occur to those skilled in the art which fall within the spirit and intended scope of the appended claims.

The invention claimed is:

1. A battery comprising:
   a battery case defining an interior volume; and
   an electrode assembly mounted in the interior volume, the electrode assembly includes a plurality of metal reinforcing strips and a plurality of planar elements, the plurality of planar elements includes a plurality of positive electrodes, a plurality of negative electrodes, and a plurality of separators;
   each of the positive electrodes includes
      a metal substrate having a peripheral edge defining an active area and a tab extending from the active area,
      a layer of positive active material on the active area of the positive electrodes;
   each of the negative electrodes includes
      a metal substrate having a peripheral edge defining an active area and a tab extending from the active area,
      a layer of negative active material on the active area of the negative electrodes;
   the tab of each positive electrode and the tab of each negative electrode having a face attached to one of the reinforcing strip such that each reinforcing strip is attached to a single one of the tabs;
   the plurality of planar elements are arranged in a stack of alternating positive and negative electrodes with a separator between adjacent electrodes; and
   the positive electrode tabs are aligned to form a positive tab column and the negative electrode tabs are aligned to form a negative tab column that spaced apart from the positive tab column, including a plurality of clips that each includes an integral metal piece having first and second portions bent around a foldline; and wherein each of the clips is mounted on an electrode tab with the clip first portion attached to a front face of the tab and the second portion attached to a rear face of the tab such that the first portion and the second portion each serve as one of the metal reinforcing strips.

2. The battery of claim 1, wherein each clip on the positive electrode tabs is sufficiently thick to abut a clip on an adjacent tab along the positive tab column; and wherein
   each clip on the negative electrode tabs is sufficiently thick to abut a clip on an adjacent tab along the negative tab column.

3. The battery of claim 1, wherein each clip has a first alignment hole and a second alignment hole extending through the first portion of the clip, the second portion of the clip, and the tab between the first portion of the clip and the second portion of the clip, the first alignment hole being spaced apart from the second alignment hole.

4. The battery of claim 3, wherein each of the clips is trimmed to define a reference edge; and wherein
   the first alignment hole and the second alignment hole in each clip is referenced to the reference edge.

5. The battery of claim 3, wherein the alignment holes are circular.

6. The battery of claim 3, wherein the alignment holes are noncircular.

7. The battery of claim 3, further comprising;
   registration pins extending through the first alignment holes and the second alignment holes.

8. The battery of claim 3, wherein the foldline of each clip includes an interior foldline and an exterior foldline, and the interior foldline is positioned adjacent to an outer edge of the tab to which the clip is attached.

9. The battery of claim 8, wherein each clip on the positive electrode tabs is sufficiently thick to abut a clip on an adjacent tab along the positive tab column; and wherein
   each clip on the negative electrode tabs is sufficiently thick to abut a clip on an adjacent tab along the negative tab column.

10. The battery of claim 9, wherein a first weld bonds together the clips attached to the positive electrode tabs; and wherein
    a second weld bonds together the clips attached to the negative.

11. The battery of claim 9, wherein each clip includes an opening extending from the interior foldline to the exterior foldline such that a portion of the tab to which the clip is attached is exposed through the opening; and wherein
    the first weld bonds together the portions of the positive electrode tabs that are exposed through the openings; and
    the second weld bonds together the portions of the negative electrode tabs that are exposed through the openings.

12. The battery of claim 1, wherein each separator in the stack has a tab bridging the spacing between the tab on a positive electrode adjacent to the separator and the tab a negative electrode adjacent to the separator.

13. The battery of claim 1, wherein first alignment holes and second alignment holes extend through each of the positive electrode tabs and through each of the reinforcing strips attached to the positive electrode tabs;
    the first alignment holes are aligned in the positive tab column;
    the second alignment holes are aligned in the positive tab column;
    third alignment holes and fourth alignment holes extend through each of the negative electrode tabs and through each of the reinforcing strips attached to the negative electrode tabs;

the third alignment holes are aligned in the negative tab column; and the fourth alignment holes are aligned in the negative tab column.

14. The battery of claim 13, further comprising:
registration pins extending through the first alignment holes, the second alignment holes, the third alignment holes, and the fourth alignment holes.

15. The battery of claim 13, wherein
fifth alignment holes and sixth alignment holes extend through a tab included in each separator;
each separator tab bridges the spacing between tabs on a positive electrode adjacent to the separator and a negative electrode adjacent to the separator; and
the fifth alignment holes are aligned with the second alignment holes; and
the sixth alignment holes are aligned with the third alignment holes.

16. The battery of claim 15, wherein each separator tab is compressed between reinforcing strips in the positive tab column and between reinforcing strips in the negative tab column.

17. The battery of claim 1, wherein each of the metal substrates has a thickness within a range of 5 to 30 microns and each of the active material layers has a thickness within a range of 30 to 120 microns.

18. The battery of claim 17, wherein each of the separators has a thickness within a range of 20 to 30 microns.

19. The battery of claim 18, wherein the reinforcing strips on each positive electrode tab are sufficiently thick to abut reinforcing strips on an adjacent positive electrode tab in the stack; and wherein
the reinforcing strips on each negative electrode tab are sufficiently thick to abut reinforcing strips on an adjacent negative electrode tab in the stack.

20. A battery, comprising:
an electrode assembly that includes a stack of planar elements, the planar elements include a plurality of alternately arranged positive electrodes and negative electrodes and means for separating adjacent electrodes;
each of the electrodes including a substrate defining an active area and a tab extending therefrom;
each tab having a first reinforcing strip attached to a front face of the tab and a second reinforcing strip attached to a rear face of the tab such that each first reinforcement strip is attached to a single one of the tabs and each second reinforcement strip is attached to a single one of the tabs;
the tabs of the positive electrodes in the stack being aligned to form a positive tab column;
the tabs of the negative electrodes in the stack being aligned to form a negative tab column extending parallel to and displaced from the positive tab column; and wherein
a first weld bonds together the positive electrode tab reinforcing strips; and
a second weld bonds together the negative electrode tab reinforcing strips.

21. A method of fabricating an electrode assembly, comprising
forming a plurality of positive electrodes each including
a substrate defining a substrate active area and a tab extending from the active area, and
a positive active material on the active area of the positive electrodes; forming a plurality of negative electrodes each including
a substrate defining a substrate active area and a tab extending from the active area, and
a negative active material on the active area of the negative electrodes;
attaching a first reinforcing strip to a front face of each of the tabs such that each first reinforcing strip is attached to a single one of the tabs;
attaching a second reinforcing strip to a rear face of each of the tabs such that each second reinforcing strip is attached to a single one of the tabs;
forming first and second alignment holes through each of the reinforcing strips;
alternately stacking the positive and negative electrodes together with separators interposed between adjacent electrodes to align positive electrode tabs along a first column and negative electrode tabs along a second column;
welding together the reinforcing strips attached to the positive electrode tabs; and
welding together the reinforcing stripe attached to the negative electrode tabs.

* * * * *